(12) United States Patent
Suzuki et al.

(10) Patent No.: US 9,422,007 B2
(45) Date of Patent: Aug. 23, 2016

(54) VEHICLE BODY FRONT PART STRUCTURE

(71) Applicant: Nissan Motor Co., Ltd., Kanagawa (JP)

(72) Inventors: Shinya Suzuki, Kanagawa (JP); Naoya Koizumi, Kanagawa (JP); Takashi Tomiyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/895,941

(22) PCT Filed: Apr. 15, 2014

(86) PCT No.: PCT/JP2014/060688
§ 371 (c)(1),
(2) Date: Dec. 4, 2015

(87) PCT Pub. No.: WO2014/199718
PCT Pub. Date: Dec. 18, 2014

(65) Prior Publication Data
US 2016/0121932 A1    May 5, 2016

(30) Foreign Application Priority Data

Jun. 12, 2013  (JP) ................. 2013-123397
Jun. 12, 2013  (JP) ................. 2013-123407

(51) Int. Cl.
| | |
|---|---|
| *B62D 21/00* | (2006.01) |
| *B62D 21/15* | (2006.01) |
| *B62D 25/08* | (2006.01) |
| *B60R 19/24* | (2006.01) |
| *B60R 19/34* | (2006.01) |
| *B62D 21/02* | (2006.01) |

(52) U.S. Cl.
CPC ............ *B62D 21/152* (2013.01); *B60R 19/24* (2013.01); *B60R 19/34* (2013.01); *B62D 21/02* (2013.01); *B62D 21/155* (2013.01); *B62D 25/082* (2013.01); *B60R 2019/247* (2013.01)

(58) Field of Classification Search
CPC  B62D 21/152; B62D 21/155; B62D 25/082; B60R 19/24; B60R 19/34
USPC ........................................ 296/187.09, 187.1
See application file for complete search history.

(56) References Cited

U.S. PATENT DOCUMENTS

| 7,296,824 B2* | 11/2007 | Yasui | B62D 21/152 280/784 |
|---|---|---|---|
| 2010/0259033 A1 | 10/2010 | Okabe et al. | |
| 2012/0248820 A1 | 10/2012 | Yasui et al. | |
| 2013/0320710 A1* | 12/2013 | Watanabe | B62D 25/082 296/187.09 |
| 2014/0167450 A1* | 6/2014 | Sotoyama | B62D 21/152 296/187.09 |

FOREIGN PATENT DOCUMENTS

| JP | 2004-306871 A | 11/2004 |
|---|---|---|
| JP | 2009-154859 A | 7/2009 |
| JP | 2009-173137 A | 8/2009 |
| JP | 2010-184706 A | 8/2010 |
| JP | 2012-214211 A | 11/2012 |

* cited by examiner

Primary Examiner — Joseph D Pape
(74) Attorney, Agent, or Firm — Osha Liang LLP (57) ABSTRACT

A vehicle body front part structure has a front side member that is located at a front part of a body of a vehicle and that extends in a vehicle front-rear direction, a shock absorption bracket that projects from an outer side surface in a vehicle width direction at a front end portion of the front side member toward an outside in the vehicle width direction, a hood ridge body that is disposed above the front side member and that extends in the vehicle front-rear direction, and a hood ridge extension member that extends from a front end of the hood ridge body toward the front of the vehicle. The shock absorption bracket has a front surface connected to a front end surface of the front side member, and an inclined surface.

4 Claims, 11 Drawing Sheets

VEHICLE BODY FRONT PART STRUCTURE

CROSS-REFERENCE TO RELATED APPLICATIONS

This application is a national stage application of PCT/JP2014/060688 filed on Apr. 15, 2014, and claims priority to Japanese Patent Application No. 2013-123397 filed on Jun. 12, 2013, and Japanese Patent Application No. 2013-123407 filed on Jun. 12, 2013, the contents of which are incorporated herein by reference in their entirety.

BACKGROUND

1. Technical Field

The present invention relates to a vehicle body front part structure.

2. Related Art

A vehicle body front part structure has been publicly known in which, at a front part of a vehicle body, a pair of right and left front side members are arranged in a vehicle front-rear direction, and a bumper reinforcement is provided so as to bridge between front ends of the pair of front side members (see Patent Literature 1, for example).

The vehicle body front part structure described in Patent Literature 1 is provided with an extended portion, which is formed by extending an end portion of the bumper reinforcement to outside in a vehicle width direction of one of the front side members in order to absorb a collision load attributed to an offset collision.

CITATION LIST

Patent Literature

Patent Literature 1: Japanese Patent Application Publication No. 2004-306871

SUMMARY OF INVENTION

However, according to the vehicle body front part structure described in Patent Literature 1, when a collision load attributed to an offset collision is inputted to the extended portion of the bumper reinforcement, there is a risk of an increase in collision load to be inputted to the vehicle body due to a failure to absorb the collision load with the extended portion alone.

In view of the above, a vehicle body front part structure according to one or more embodiments of the present invention may reduce a collision load to be inputted to a vehicle body when the collision load is inputted to a region outside in a vehicle width direction of a front side member.

In a vehicle body front part structure according to one or more embodiments of the present invention, a shock absorption bracket is made to project from a front end portion of a front side member toward outside in a vehicle width direction. In the shock absorption bracket, its front surface is connected to a front end surface of the front side member, and its inclined surface is obliquely extended toward the outside in the vehicle width direction from an outer end in the vehicle width direction of the front surface as extended toward the rear of the vehicle. Moreover, the front surface and the inclined surface are integrally formed.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that in the drawings, a front side of a vehicle is indicated with FR while a rear side thereof is indicated with RR. Meanwhile, a right side in a vehicle width direction is indicated with RH while a left side thereof is indicated with LH.

Figure 1:
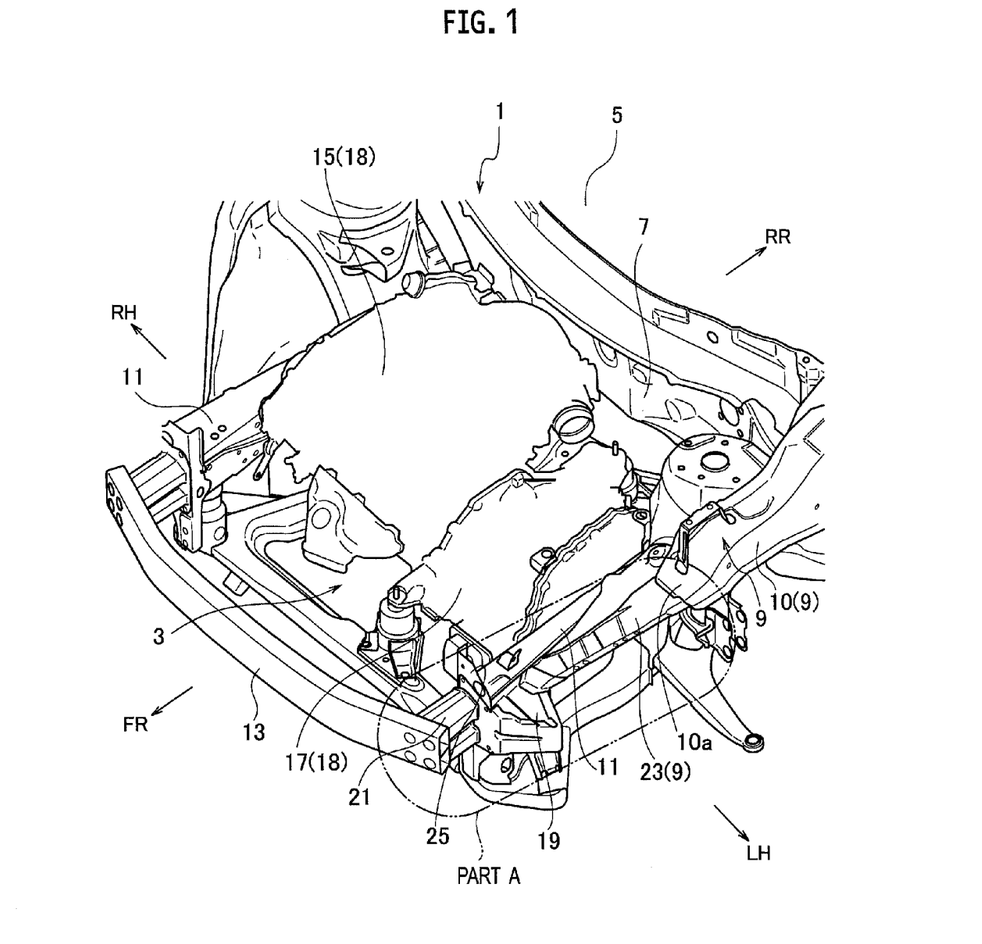
FIG. 1 is a perspective view showing a vehicle body front part according to one or more embodiments of the present invention.
Figure 2:
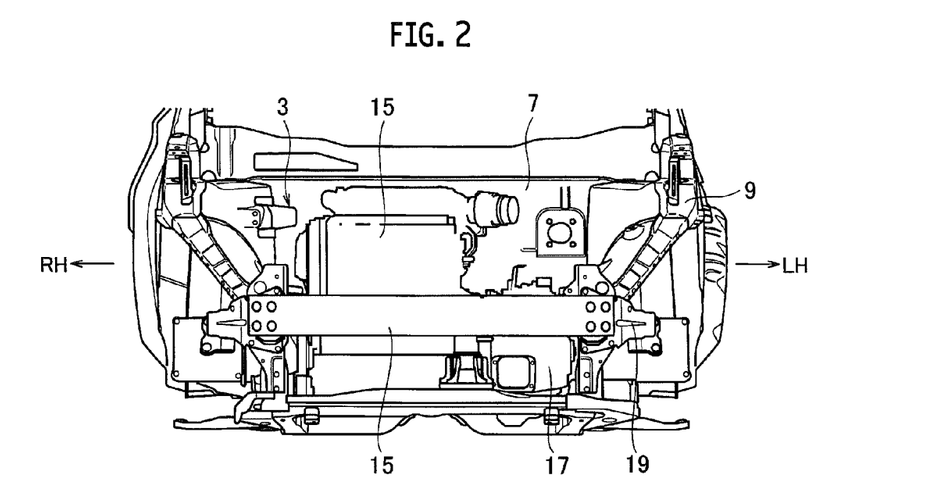
FIG. 2 is a front view of FIG. 1 viewed from the front.
Figure 3:
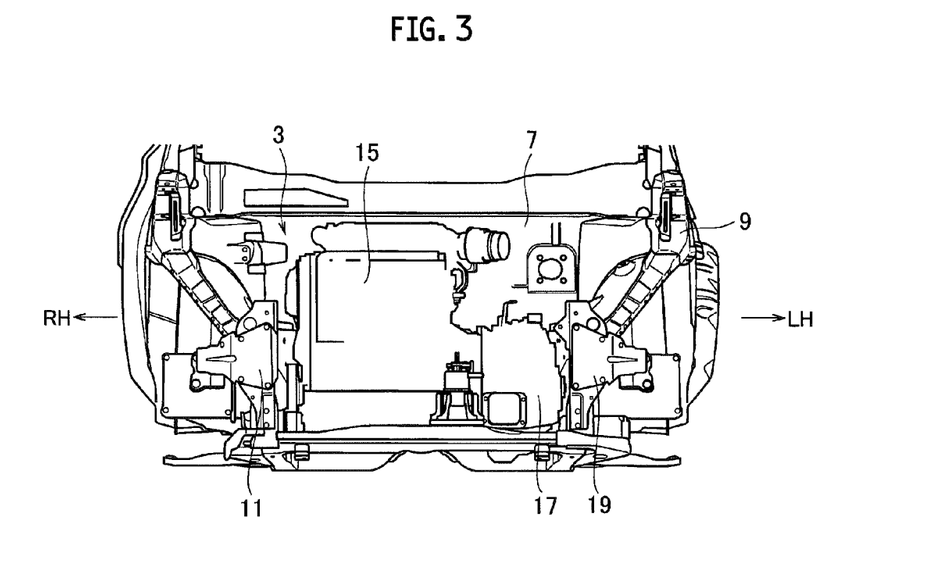
FIG. 3 is a front view of a state where a bumper reinforcement is removed from FIG. 2.

As shown in FIG. 1 to FIG. 3, an engine room 3 is provided at a vehicle body front part 1 according to one or more embodiments of the present invention. The engine room 3 is defined by: a dash panel 7 which separates the engine room 3 and a vehicle cabin 5; hood ridges 9 located on both right and left ends; a pair of right and left front side members 11 located below the hood ridges 9 and extended in a vehicle front-rear direction; and a bumper reinforcement 13 located on a front end of the vehicle body and extended in the vehicle width direction.

Meanwhile, a power train 18 formed from an engine 15 and a transmission 17 is located in the engine room 3 between the pair of right and left front side members 11 and 11. To be more precise, the engine 15 is located on the right side in the vehicle width direction while the transmission 17 is located on the left side of the engine 15.

In addition, as described later, each hood ridge 9 is formed from a hood ridge body 10, and a hood ridge extension member 23 extended forward from a front end 10a of the hood ridge body 10.

Figure 4:
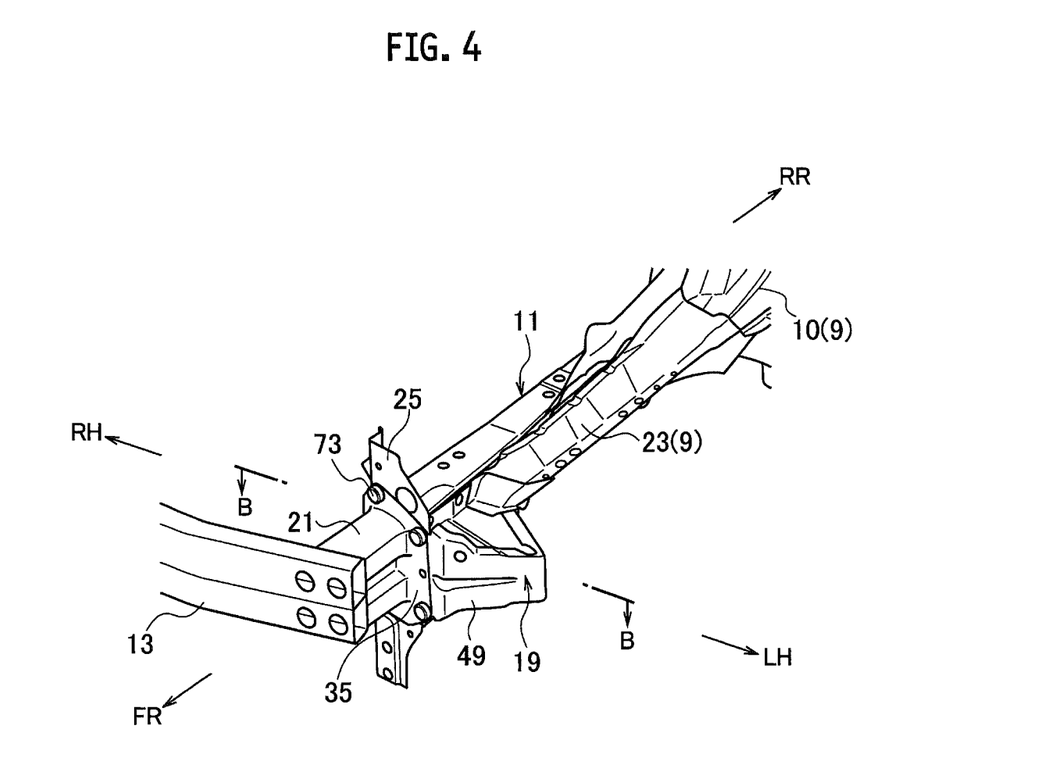
FIG. 4 is an enlarged perspective view of part A in FIG. 1.
Figure 5:
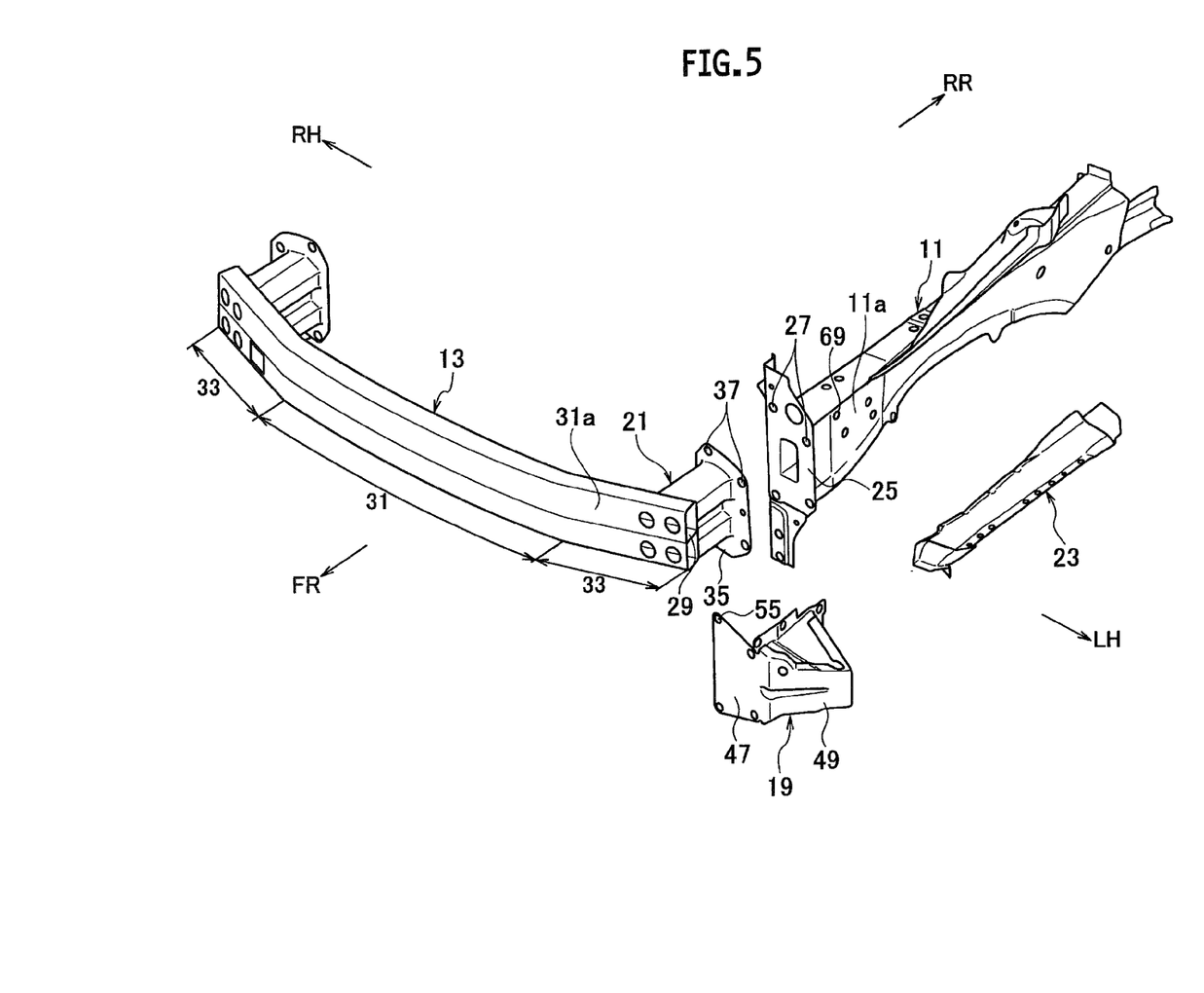
FIG. 5 is an exploded perspective view of FIG. 4.

As shown in FIGS. 1, 4, and 5, the vehicle body front part 1 includes: the front side members 11 extended in the vehicle front-rear direction; shock absorption brackets 19 provided on the outside in the vehicle width direction at front end portions of the front side members 11; the bumper reinforcement 13 located at a front end of the vehicle body and extended in the vehicle width direction; bumper stays 21 extended from end portions in the vehicle width direction of the bumper reinforcement 13 toward the rear of the vehicle; and the hood ridges 9 each formed from the hood ridge body 10 and the hood ridge extension member 23 and located above the front side members 11.

Each front side member 11 is formed into a closed cross-section structure in a rectangular shape. A front end surface 25 extended in the vehicle width direction as well as in a vertical direction is formed on a front end of the front side member 11. Bolt holes 27 are formed in four corner portions on the left, right, top, and bottom of the front end surface 25.

Of the bumper reinforcement 13, a length in the vehicle width direction is set almost as the same size as a distance between the pair of right and left front side members 11 and 11. The bumper reinforcement 13 is formed into a rectangular tube shape, and a partition plate 29 is provided at the center in the vertical direction thereof. Moreover, a central portion 31 in the vehicle width direction is extended straight in a plan view. Meanwhile, each outer side portion 33 in the vehicle width direction is bent from an outer end 31a in the vehicle width direction of the central portion 31, and is obliquely inclined toward the rear of the vehicle from the outer end 31a as extended toward the outside in the vehicle width direction.

Meanwhile, each bumper stay 21 is formed into a closed cross-section structure and a flange 35 is formed at a rear end thereof. This flange 35 is provided with bolt holes 37 at positions corresponding to the bolt holes 27 in the front end surface 25 of the front side member 11 described above.

Figure 6:
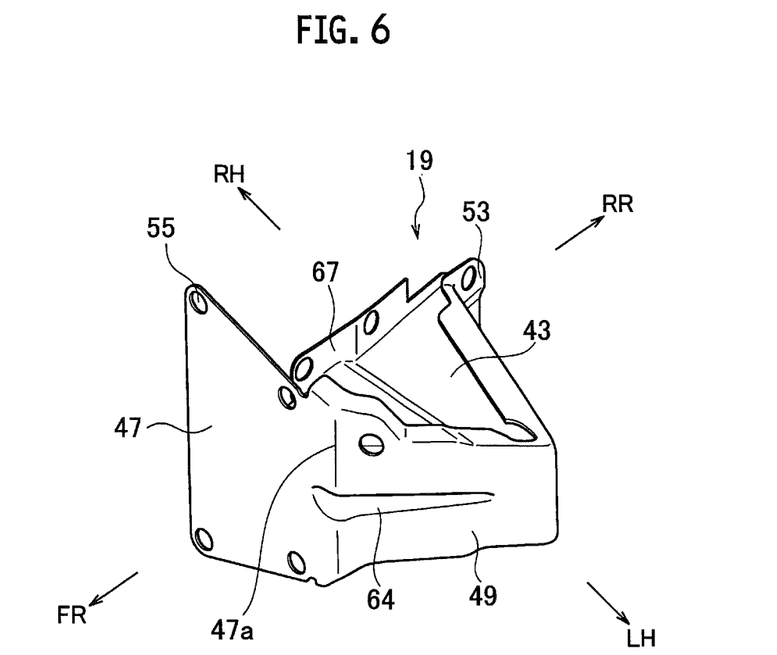
FIG. 6 is a perspective view showing a shock absorption bracket according to one or more embodiments of the present invention.
Figure 7:
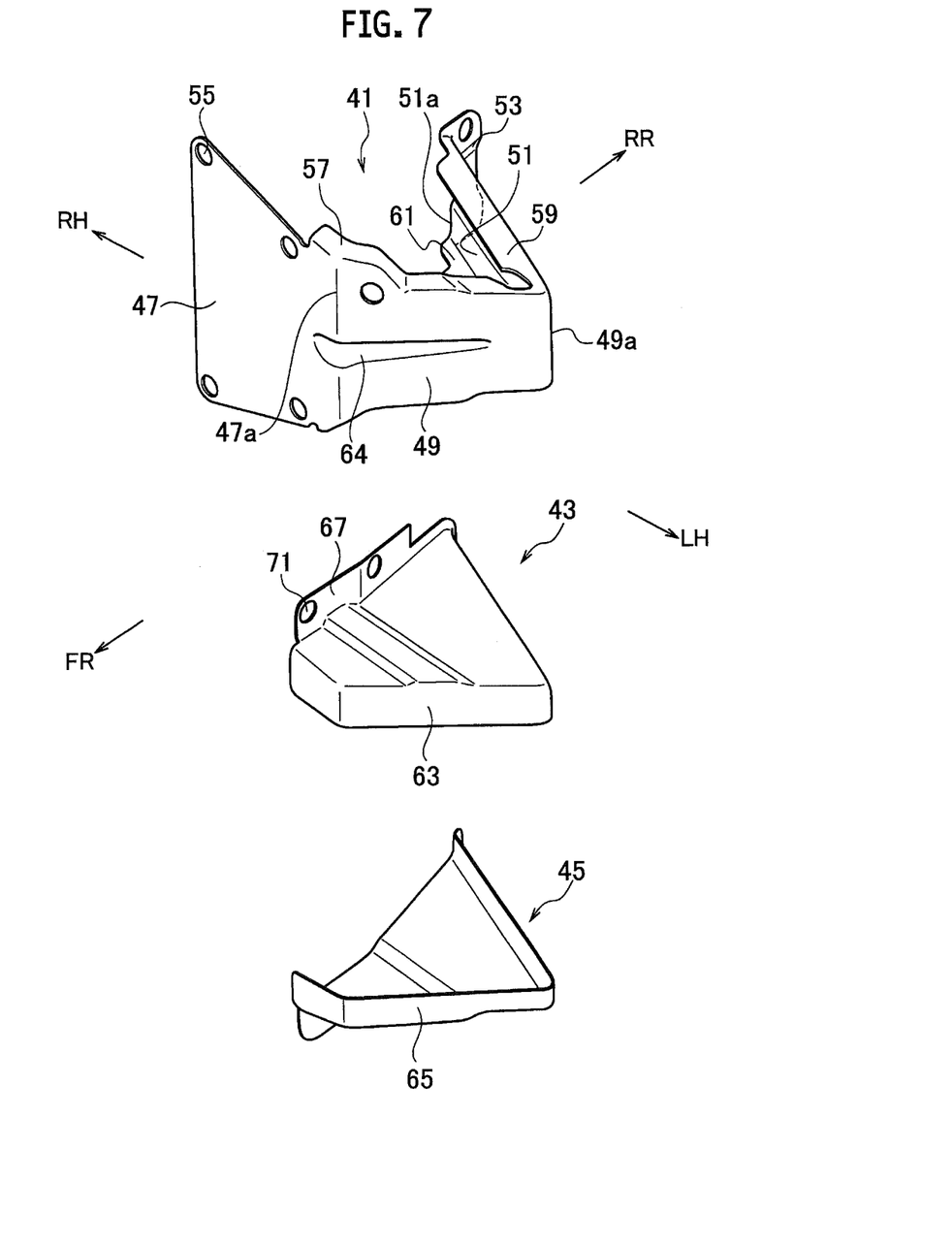
FIG. 7 is an exploded perspective view of FIG. 6.

Now, the shock absorption brackets 19 will be described with reference to FIGS. 6 and 7.

Each shock absorption bracket 19 projects from an outer side surface 11a in the vehicle width direction at the front end portion of the front side member 11 toward the outside in the vehicle width direction. Specifically, the shock absorption bracket 19 includes a bracket body 41, an upper bracket 43 joined to an upper end portion of the bracket body 41 to seal the upper end portion, and a lower bracket 45 joined to a lower end portion of the bracket body 41 to seal the lower end portion.

The bracket body 41 includes: a front surface 47 which is located on a front side of the vehicle; an inclined surface 49 which, in a plan view, is bent from an outer end 47a in the vehicle width direction of the front surface 47 and is obliquely extended toward the outside in the vehicle width direction (the left side in FIGS. 6 and 7) from the outer end 47a as extended toward the rear of the vehicle; a rear surface 51 which is bent from an outer end 49a in the vehicle width direction of the inclined surface 49 and is extended toward the inside in the vehicle width direction (the right side in FIGS. 6 and 7); and a rear flange portion 53 which is bent from an inner end 51a in the vehicle width direction of the rear surface 51 and is extended toward the rear of the vehicle. The entire bracket body 41 is integrally formed. In other words, all of the front surface 47, the inclined surface 49, the rear surface 51, and the rear flange portion 53 are formed by pressing a single steel plate.

Bolt holes 55 are formed in four corner portions of the front surface 47, respectively. The bolt holes 55 are located to correspond to the bolt holes 27 in the front end surface 25 of the front side member 11 and to the bolt holes 37 in the flange 35 of the bumper stay 21 described above.

Upper joint flanges 57 and 59 are formed on upper ends of the inclined surface 49 and the rear surface 51, and a lower joint flange 61 is formed on lower ends thereof.

In the meantime, a joint flange 63 that is bent and extended downward is formed on a peripheral edge of the upper bracket 43, and a joint flange 65 that is bent and extended upward is also formed on a peripheral edge of the lower bracket 45. Accordingly, the peripheral edge of the upper bracket 43 is joined to the upper joint flanges 57 and 59 at the upper ends of inclined surface 49 and the rear surface 51 of the bracket body 41, and the joint flange 63 of the upper bracket 43 is joined to inside surfaces of the upper ends of the inclined surface 49 and the rear surface 51. Thus, an upper opening of the bracket body 41 is sealed.

Meanwhile, the peripheral edge of the lower bracket 45 is joined to the lower joint flange 61 at the lower ends of inclined surface 49 and the rear surface 51 of the bracket body 41, and the joint flange 65 of the lower bracket 45 is joined to inside surfaces of the lower ends of the inclined surface 49 and the rear surface 51. Thus, a lower opening of the bracket body 41 is sealed.

Furthermore, a reinforcement rib 64 extended in the front-rear direction is formed at the center in the vertical direction in a region from the outer end 47a in the vehicle width direction of the front surface 47 to the inclined surface 49. Here, an attachment flange 67 which is bent and extended upward is formed at an inner end in the vehicle width direction of the upper bracket 43. The attachment flange 67 is located to correspond to bolt holes 69 that are formed in the outer side surface 11a of the front side member 11, and the upper bracket 43 is bolt-connected to the outer side surface 11a of the front side member 11 via the attachment flange 67.

Next, procedures for attaching the shock absorption brackets 19 will be described with reference to FIGS. 4 and 5.

First, the front surface 47 of the shock absorption bracket 19 is located at the front end surface 25 of the front side member 11 while causing the bolt holes 27 and 55 to correspond to one another. At this time, bolt holes 71 provided in the upper bracket 43 of the shock absorption bracket 19 are located to correspond to the bolt holes 69 in the outer side surface 11a of the front side member 11.

Next, the bolt holes 37 in the flange 35 of the bumper stay 21, which is connected to a rear side of the bumper reinforcement 13, are located to correspond to the bolt holes 55 in the front surface 47 of the shock absorption bracket 19.

Then, bolts 73 (see FIG. 4) are inserted into the bolt holes 37 in the flange 35 of the bumper stay 21 and are fastened. Thus, the front surface 47 of the shock absorption bracket 19 is sandwiched between the bumper stay 21 and the front side member 11. In this way, the shock absorption brackets 19 are attached to the front side members 11.

Figure 8:
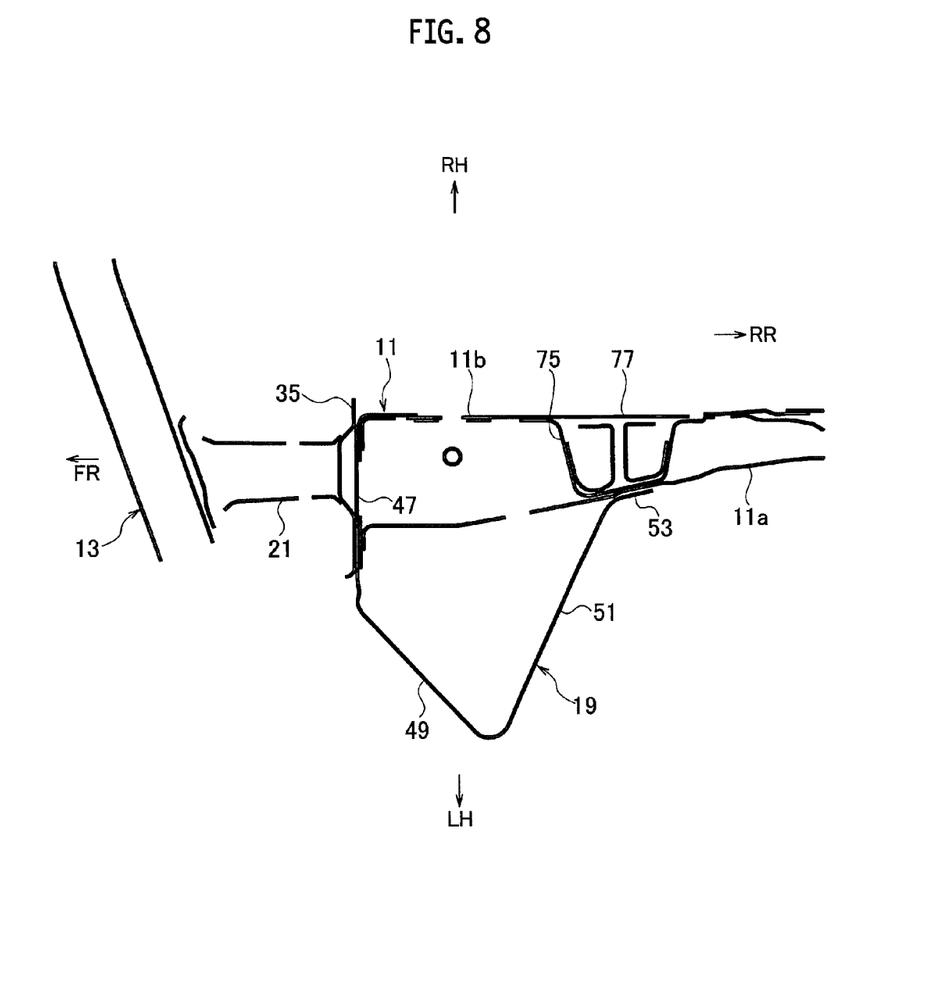
FIG. 8 is a cross-sectional view taken along a B-B line in FIG. 4.

Here, as shown in FIG. 8, a reinforcement bracket 75 is arranged inside the front side member 11 at a region of the front side member 11 to which the rear flange portion 53 of the shock absorption bracket 19 is connected. Rigidity is increased at this region because the region is set as a mount portion 77 where the transmission 17 (see FIG. 1) is attached to an inner side surface 11b of in the vehicle width direction of the front side member 11.

Figure 9:
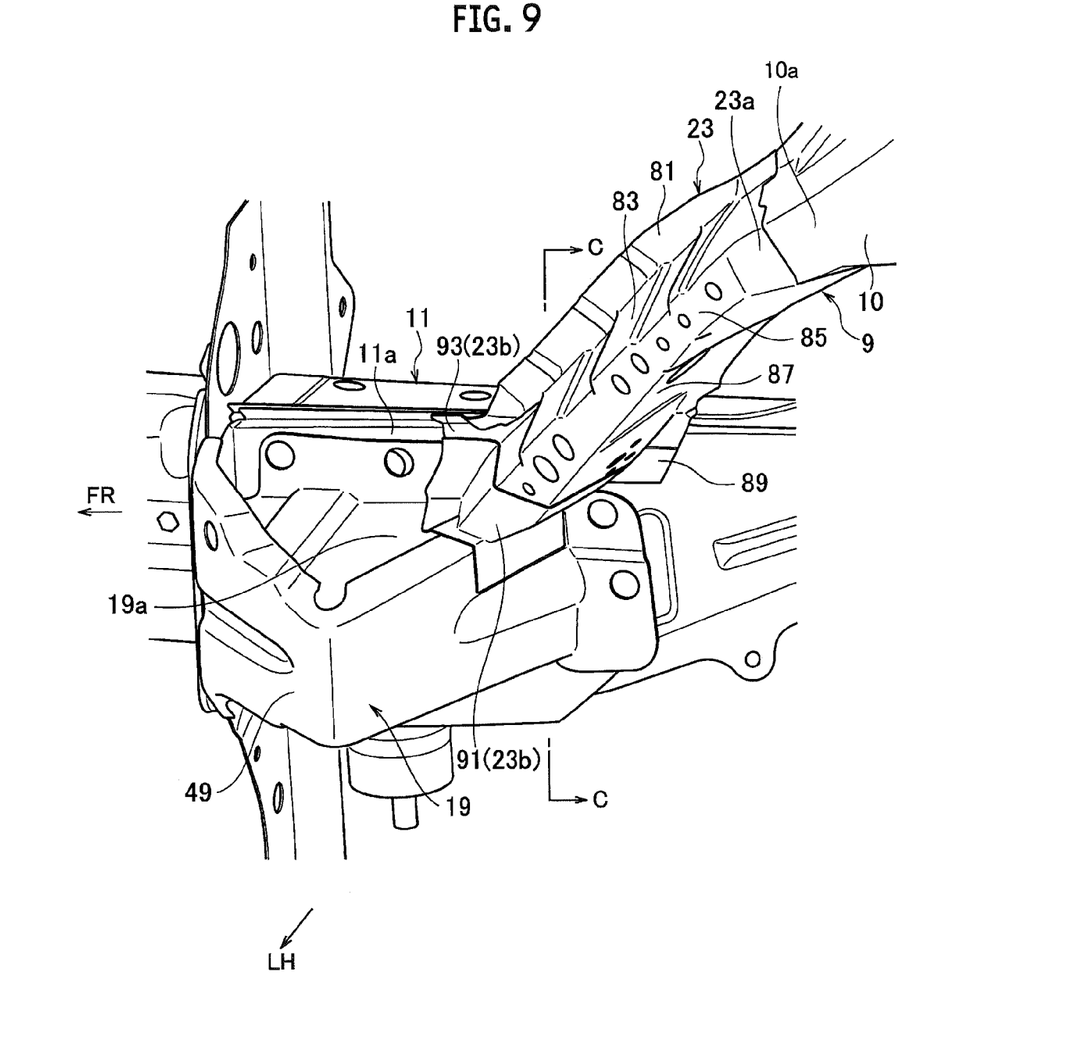
FIG. 9 is a perspective view showing the vicinity of a junction between a front part of a hood ridge extension member and the shock absorption bracket.
Figure 10:
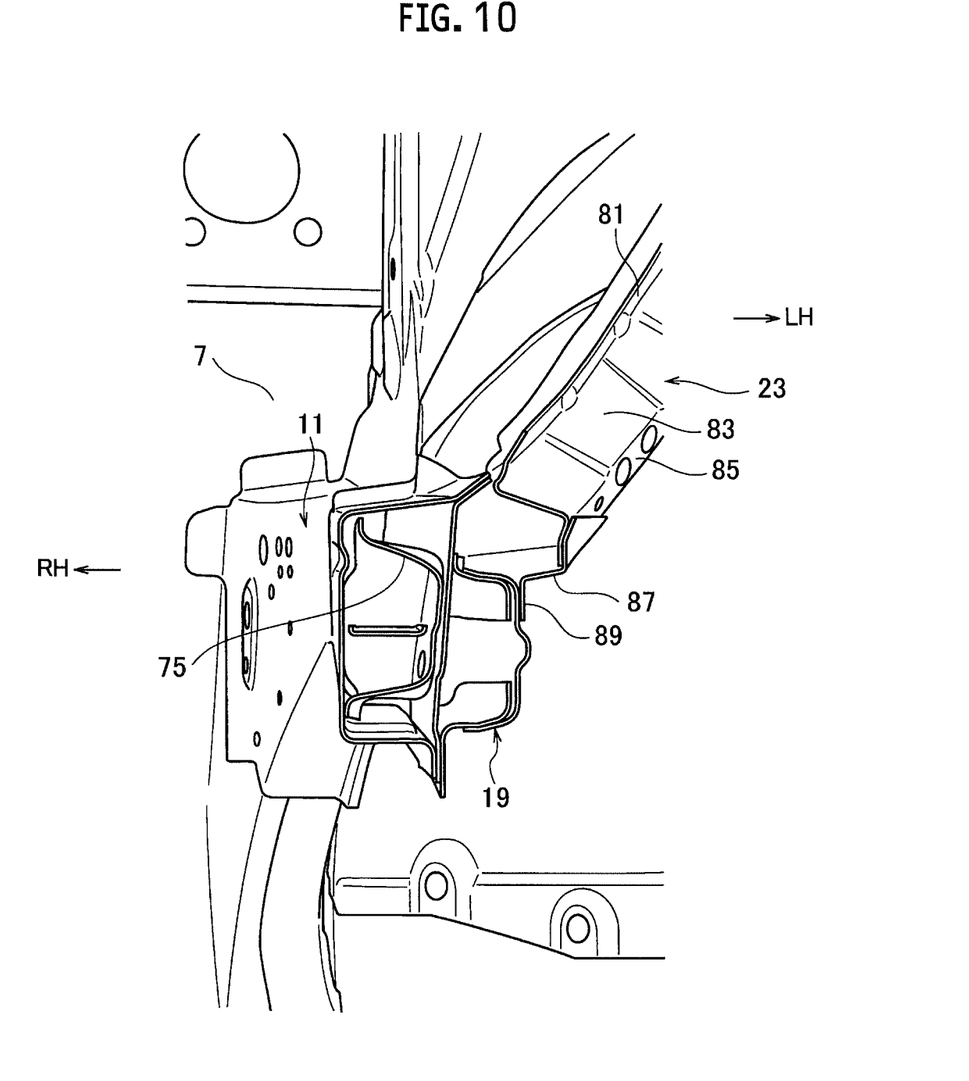
FIG. 10 is a cross-sectional view taken along a C-C line in FIG. 9.

Next, the hood ridges 9 will be described with reference to FIGS. 9 and 10.

As described previously, each hood ridge 9 is located above the front side member 11, and includes the hood ridge body 10 and the hood ridge extension member 23. As shown in FIG. 1, the front end 10a of the hood ridge body 10 is located in the vicinity of a central part in the vehicle front-rear direction of the engine room 3, and the hood ridge extension member 23 is extended from the front end 10a of the hood ridge body 10 toward the front of the vehicle. In other words, a rear end portion 23a of the hood ridge extension member 23 is joined to the front end 10a of the hood ridge body 10.

As shown in FIG. 1 to FIG. 4, each hood ridge extension member 23 is extended obliquely downward and toward the inside in the vehicle width direction as extended from the front end 10a of the hood ridge body 10 forward. Moreover, as shown in FIGS. 9 and 10, each hood ridge extension member 23 is formed into a hat-like cross-sectional shape in which its aperture is located inward in the vehicle width direction. A front part 23b of the hood ridge extension member 23 is joined to an upper surface 19a of the shock absorption bracket 19.

Specifically, the hood ridge extension member 23 is integrally formed from: an upper flange 81 located on an upper side of the vehicle; an upper longitudinal wall portion 83 which is bent and extended from the upper flange 81 toward the outside in the vehicle width direction (the left side of the vehicle); a side wall portion 85 which is bent and extended downward from an outer end in the vehicle width direction of the upper longitudinal wall portion 83; a lower longitudinal wall portion 87 which is bent and extended from a lower end of the side wall portion 85 toward the inside in the vehicle width direction (the right side of the vehicle); and a lower flange 89 which is bent and extended downward from an inner end in the vehicle width direction of the lower longitudinal wall portion 87. Here, a connection member 91 of another component is joined to a front end portion of the hood ridge extension member 23. This connection member 91 constitutes the front part 23b of the hood ridge extension member 23. Moreover, the connection member 91 is joined to the upper surface 19a of the shock absorption bracket 19. Meanwhile, an upper part of a connection portion 93 of the hood ridge extension member 23 to be joined to the connection member 91 also constitutes the front part 23b of the hood ridge extension member 23. The upper part of the connection portion 93 is also joined to the outer side surface 11a in the vehicle width direction of the front side member 11. As described above, the front part 23b of the hood ridge extension member 23 is connected across both the front side member 11 and the shock absorption bracket 19. Here, as shown in FIG. 10, the reinforcement bracket 75 is arranged inside the closed cross section of the front side member 11 at the region to which the upper part of the connection portion 93 of the hood ridge extension member 23 is joined.

A description will be given below of a time-series variation in shape of the vehicle body front part when a collision load directed to the rear of the vehicle is inputted from an obstacle to the vehicle body front part.

Figure 11:
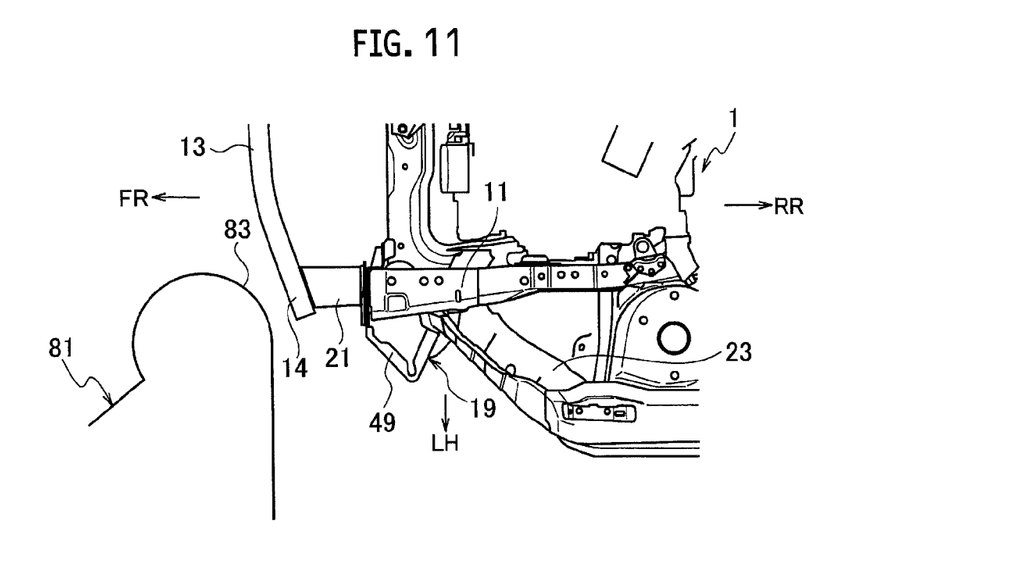
FIG. 11 is a plan view of the vehicle body front part according to one or more embodiments of the present invention, which shows a state before a collision load is inputted to the vehicle body front part.

FIG. 11 shows a normal state before a collision, where an obstacle 81 is located in front of the left side in the vehicle width direction of the front side member 11. In particular, an end portion 83 of the obstacle 81 is located in front of and close to an end portion 14 in the vehicle width direction of the front side member 11.

Figure 12:
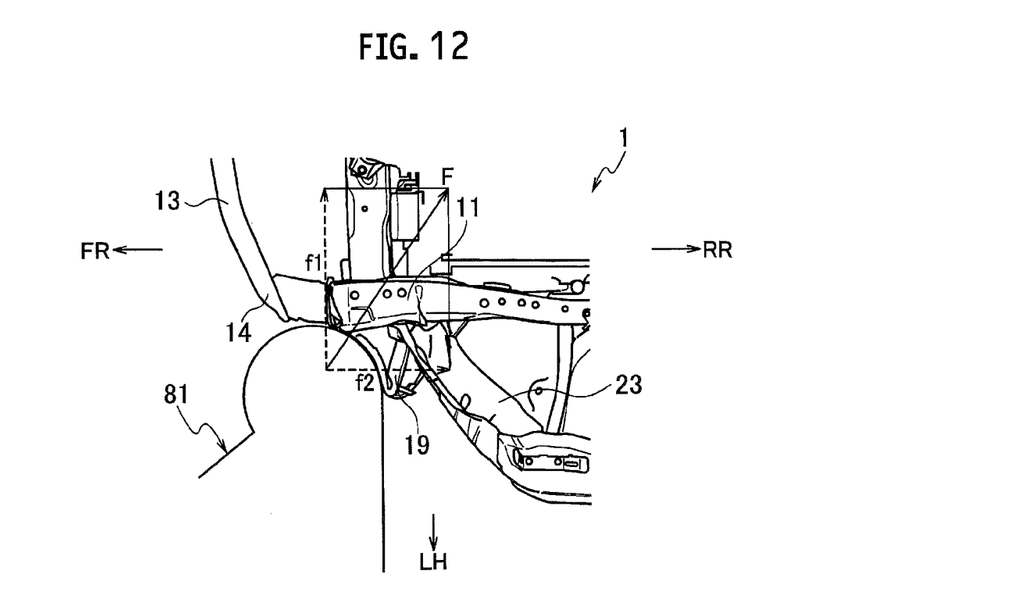
FIG. 12 is a plan view of the vehicle body front part showing an initial state of the input of the collision load to the vehicle body front part.

Next, as shown in FIG. 12, when the obstacle 81 collides with the inclined surface 49 of the shock absorption bracket 19, a collision load F that is directed obliquely inward in the vehicle width direction and toward the rear of the vehicle is inputted to the vehicle body front part 1 via the inclined surface 49.

Figure 13:
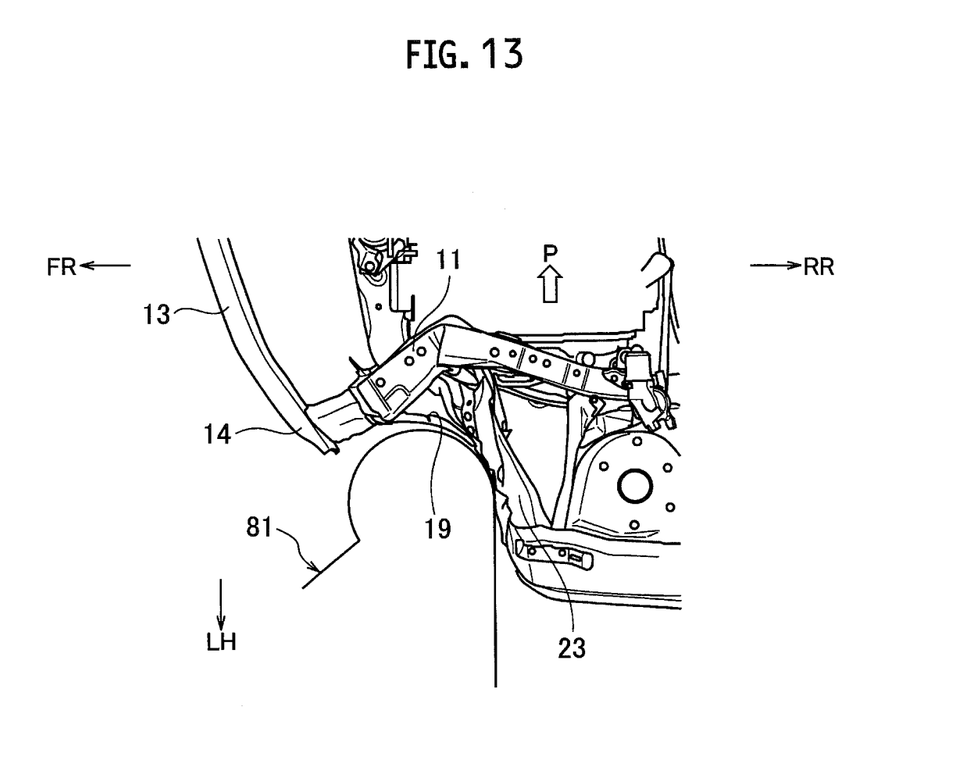
FIG. 13 is a plan view of the vehicle body front part showing a later state of the input of the collision load to the vehicle body front part.

Here, the collision load F can be decomposed into an inward load component f1 directed to the inside in the vehicle width direction and a rearward load component f2 directed to the rear of the vehicle. As shown in FIG. 13, the inward load component f1 moves the vehicle body to the right side in the vehicle width direction (see an arrow P). Thus, it is possible to reduce an impact that the vehicle body receives from the obstacle 81. Meanwhile, by the inward load component f1, the front side member 11 is prompted to be bent and deformed toward the inside in the vehicle width direction starting from the vicinity of a portion to which to attach the shock absorption bracket 19.

Moreover, as described previously, the front part 23b of the hood ridge extension member 23 is joined to the upper surface 19a of the shock absorption bracket 19. Furthermore, the front part 23b of the hood ridge extension member 23 is connected across both the front side member 11 and the shock absorption bracket 19.

Accordingly, as shown in FIG. 13, the front side member 11 on the left side of the vehicle is bent toward the inside in the vehicle width direction instead of toward an upper side of the vehicle, thereby pushing the transmission 17 to the inside in the vehicle width direction (the right side of the vehicle). The pushing force is transmitted to the front side member 11 on the right side of the vehicle via the engine 15. Thus, the vehicle can efficiently absorb the collision load F in the case of a front collision.

Operation and effect of this embodiment will be described below.

(1) The vehicle body front part structure according to one or more embodiments of the present invention includes the front side members 11, 11 located at the vehicle body front part 1 and extended in the vehicle front-rear direction, and the shock absorption brackets 19, 19 projecting from the outer side surfaces 11a, 11a in the vehicle width direction at the front end portions of the front side members 11 toward the outside in the vehicle width direction.

Each shock absorption bracket 19 includes: the front surface 47 connected to the front end surface 25 of the front side member 11; and the inclined surface 49 which, in a plan view, is bent from the outer end 47a in the vehicle width direction of the front surface 47 and is obliquely extended toward the rear of the vehicle as extended toward the outside in the vehicle width direction. The front surface 47 and the inclined surface 49 are integrally formed.

In each shock absorption bracket 19, the front surface 47 is connected to the front end surface 25 of the front side member 11, and the front surface 47 and the inclined surface 49 are integrally formed. Accordingly, connection strength between the shock absorption bracket 19 and the front side member 11 is high. Here, when the collision load F is inputted to the inclined surface 49 of the shock absorption bracket 19, part of the collision load F is divided into the load component f1 directed to the inside in the vehicle width direction. Here, in case of occurrence of a shearing force that may tear the front surface 47 of the shock absorption bracket 19 off the front end surface 25 of the front side member 11, the shock absorption bracket 19 does not detach from the front side member 11. As a consequence, the collision load F is efficiently transmitted to the front side member 11 whereby the vehicle body moves toward the inside in the vehicle width direction and away from the obstacle 81. Thus, the input of the load to the vehicle body is reduced.

(2) There are further provided the bumper reinforcement 13 extended in the vehicle width direction, and the bumper stays 21 extended from the end portions in the vehicle width direction of the bumper reinforcement 13 toward the rear of the vehicle. The rear surface (the flange 35) of each bumper stay 21 is connected to the front end surface 25 of the corresponding front side member 11 while interposing the front surface 47 of the shock absorption bracket 19 in between.

Accordingly, the front surface 47 of the shock absorption bracket 19 is sandwiched between the front end surface 25 of the front side member 11 and the flange 35 of the bumper stay 21, and the force of connection of the shock absorption bracket 19 to the front side member 11 is further increased. As a consequence, even if the shearing force that may tear the front surface 47 of the shock absorption bracket 19 off the front end surface 25 of the front side member 11 occurs at the time of an offset collision where the collision load F is inputted to the shock absorption bracket 19, it is possible to more reliably inhibit the shock absorption bracket 19 from detachment from the front side member 11.

(3) There are also provided the engine 15 and the transmission 17 (the power train 18) which are located between the pair of right and left front side members 11 and 11 and are attached to the front side members 11, the hood ridge bodies 10 provided above the front side members 11 and extended in the vehicle front-rear direction, and the hood ridge extension members 23 extended from the front ends 10a of the hood ridge bodies 10 toward the front of the vehicle. The front parts 23b of the hood ridge extension members 23 are connected to the shock absorption brackets 19.

The shock absorption bracket 19 is provided with the inclined surface 49. For this reason, at the time of a front collision of the vehicle, the collision load F inputted to the shock absorption bracket 19 is divided into the rearward load component f2 directed to the rear of the vehicle and the inward load component f1 directed to the inside in the vehicle width direction. By the inward load component f1 directed to the inside in the vehicle width direction, the front side member 11 is prompted to be bent and deformed starting from the vicinity of the portion to which to attach the shock absorption bracket 19. Here, the hood ridge body 10 is located above the front side member 11, and the front part 23b of the hood ridge extension member 23 is connected to the shock absorption bracket 19 and thereby holds the shock absorption bracket 19. Accordingly, the bending direction of the front side member 11 is restricted to the direction not upward but toward the inside in the vehicle width direction. Thus, the front side member 11 on one side is bent and hits the power train 18, and then the collision load is transmitted to the front side member 11 on the opposite side via the power train 18. As a consequence, the collision load can be efficiently absorbed.

(4) Each front part 23b of the hood ridge extension members 23 is connected to the upper surface 19a of the shock absorption bracket 19.

As described above, the front part 23b of the hood ridge extension member 23 holds the shock absorption bracket 19 from above. Accordingly, when the front side member 11 is prompted to be bent and deformed at the time of a front collision of the vehicle, the bending direction of the front side member 11 is more reliably restricted to the direction toward the inside in the vehicle width direction.

(5) The front part 23b of the hood ridge extension member 23 is connected across both the front side member 11 and the shock absorption bracket 19.

The front part 23b of the hood ridge extension member 23 is also connected to the front side member 11. Accordingly, when the front side member 11 is prompted to be bent and deformed at the time of a front collision of the vehicle, the bending direction of the front side member 11 is more reliably restricted to the direction toward the inside in the vehicle width direction.

According to a vehicle body front part structure according to one or more embodiments of the present invention, the front surface of the shock absorption bracket is connected to the front end surface of the front side member, and the front surface and the inclined surface of the shock absorption bracket are integrally formed. For this reason, the connection strength between the shock absorption bracket and the front side member is high. Here, when the collision load is inputted to the inclined surface of the shock absorption bracket, part of the collision load is divided into the load component directed to the inside in the vehicle width direction. In this case, the shock absorption bracket is does not detach from the front side member, and the collision load is efficiently transmitted to the front side member, whereby the vehicle body moves toward the inside in the vehicle width direction and away from the obstacle. Thus, the input of the load to the vehicle body is reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

F collision load
10 hood ridge body
11 front side member
11a outer side surface of front side member
13 bumper reinforcement
15 engine (power train)
17 transmission (power train)
18 power train
19 shock absorption bracket
19a upper surface of shock absorption bracket
21 bumper stay
23 hood ridge extension member
23b front part of hood ridge extension member
25 front end surface of side member
35 flange (rear surface of bumper stay)
47 front surface of shock absorption bracket
47a outer end in vehicle width direction of front surface
49 inclined surface of shock absorption bracket

The invention claimed is:
1. A vehicle body front part structure comprising:
a front side member that is located at a front part of a body of a vehicle and that extends in a vehicle front-rear direction;
a shock absorption bracket that projects from an outer side surface in a vehicle width direction at a front end portion of the front side member toward an outside in the vehicle width direction;
a hood ridge body that is disposed above the front side member and that extends in the vehicle front-rear direction; and
a hood ridge extension member that extends from a front end of the hood ridge body toward the front of the vehicle,
wherein the shock absorption bracket comprises:
a front surface connected to a front end surface of the front side member, and an inclined surface that, in a plan view, bends from an outer end in the vehicle width direction of the front surface, and obliquely extends toward the outside in the vehicle width direction as extended toward a rear of the vehicle, and
wherein the front surface and the inclined surface are integrally formed, and
wherein a front part of the hood ridge extension member is connected across both the front side member and the shock absorption bracket.

2. The vehicle body front part structure according to claim 1, further comprising:
a bumper reinforcement that extends in the vehicle width direction; and
a bumper stay that extends from an end portion in the vehicle width direction of the bumper reinforcement toward the rear of the vehicle,
wherein a rear surface of the bumper stay is connected to the front end surface of the front side member while interposing the front surface of the shock absorption bracket in between.

3. The vehicle body front part structure according to claim 1, further comprising:
another front side member; and
a powertrain located between the front side members and attached to the front side members.

4. The vehicle body front part structure according to claim 3, wherein the front part of the hood ridge extension member is connected to an upper surface of the shock absorption bracket.

* * * * *